July 18, 1944.   C. O. BRODERS   2,354,101
FAN CONSTRUCTION
Filed Aug. 7, 1942   2 Sheets-Sheet 1

INVENTOR
Claude O. Broders
BY Harris G. Luther
Attorney

July 18, 1944.  C. O. BRODERS  2,354,101
FAN CONSTRUCTION
Filed Aug. 7, 1942  2 Sheets-Sheet 2
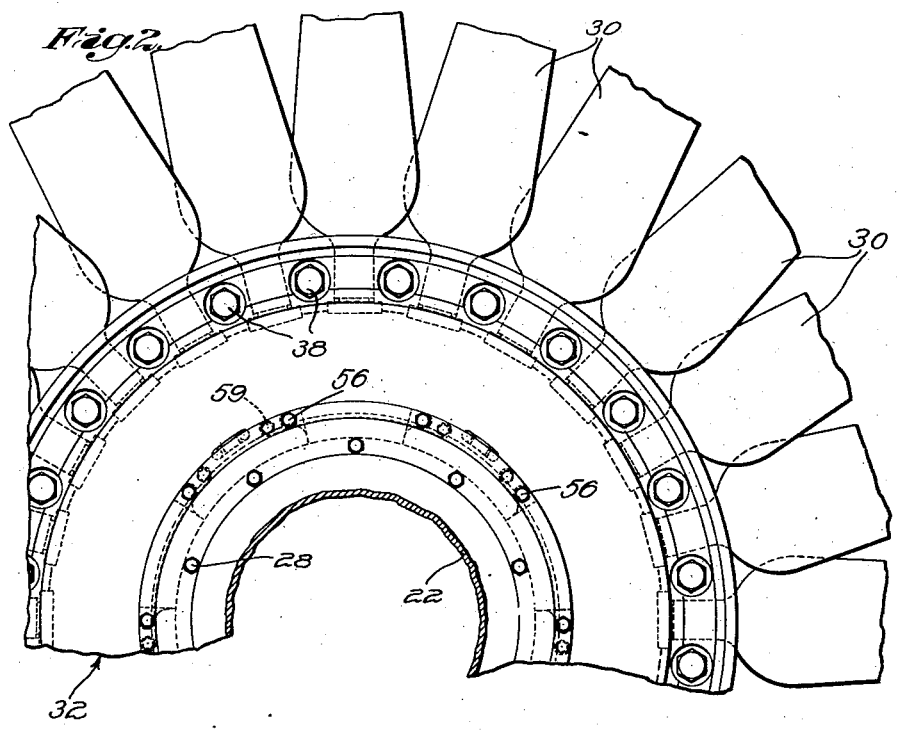
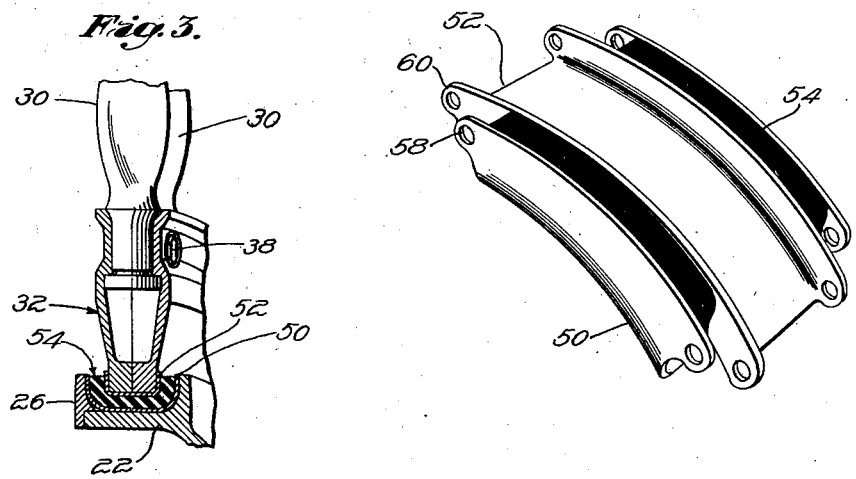
INVENTOR
Claude O. Broders
BY Harris G. Luther
Attorney Patented July 18, 1944

2,354,101

UNITED STATES PATENT OFFICE 2,354,101

FAN CONSTRUCTION

Claude O. Broders, East Hartford, Conn., assignor to United Aircraft Corporation, East Hartford, Conn., a corporation of Delaware Application August 7, 1942, Serial No. 453,969

9 Claims. (Cl. 170—173)

This invention relates to cooling fans and has for an object the provision of an improved fan construction with noise and vibration suppressing characteristics.

A further object resides in the provision, in a fan of the character indicated, of resilient means suppressing the transmission of vibrational forces between the fan hub and the blades of the fan.

A still further object resides in the provision of a fan support comprising circumferentially-spaced vibration absorbing resilient units which are simple and economical to manufacture.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings,

Fig. 2 is a front view of a portion of the fan illustrated in Fig. 1.

Fig. 3 is a perspective view of a portion of the fan shown in Fig. 1.

Fig. 4 is a perspective view of one of the vibration-absorbing resilient units.

Figure 1:
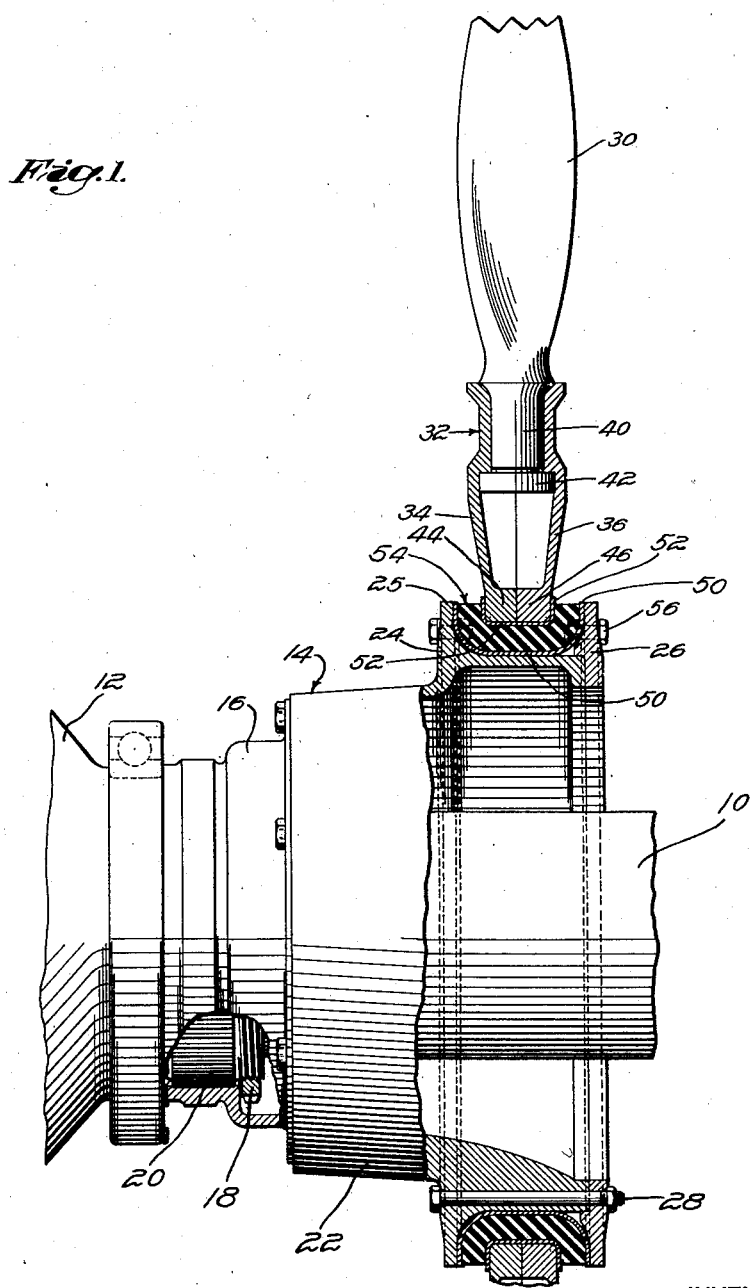
Fig. 1 is a side view, partly in section, of a fan constructed according to the invention.

An engine shaft 10 projects from a gear case 12 and carries a fan hub, generally indicated at 14. The hub is made in several annular parts of which part 16 closely surrounds the shaft and is secured by nut 18 upon splines 20 on the shaft. Portion 22 is rigidly secured to part 16 and flares outwardly from the shaft to a rim 24 provided with an annular groove defined on one side by integral flange 25, and on the other side by detachable ring 26, held in place by bolts 28.

The fan blades 30 are mounted in a split ring generally indicated at 32 and comprising sections 34 and 36 secured together by bolts 38 (Figs. 2 and 3). Each blade 30 has a shank 40 of circular cross section terminating in a flange 42, the shank and flange being held in sockets provided between sections 34 and 36. The pitch of the blades may be adjusted when bolts 38 are loosened, and will be clamped in adjusted position when the bolts are tightened again.

The inner rim of ring 32 comprises thickened abutting portions 44 and 46, integral with sections 34 and 36, respectively. By this rim, ring 32 is resiliently mounted on member 22, as by circumferentially spaced resilient units, one of which is illustrated in Fig. 4.

The unit comprises inner and outer metal channels 50 and 52 with a resilient channel-shaped cushion 54 bonded between them (Figs. 1, 3 and 4). The unit is curved longitudinally to fit the outer surface of member 22, and is clamped between flanges 25 and 26. Channels 50 are secured to flanges 25 and 26 by bolts 56 passing through the flanges and holes in ears 58 of the channels (Figs. 1, 2 and 4). Channels 52 are secured in position by bolts or pins 59 passing through rims 44, 46 and holes in ears 60 of the channels (Figs. 1, 2 and 4).

The units are made relatively short for convenience in manufacture and assembly, and to reduce cost as compared with a continuous ring. Each unit, as illustrated, occupies approximately forty degrees around the circumference of the supporting member. The exact thickness of the rubber cushion, the width and circumferential extent of the unit can readily be determined for each particular installation when the vibration characteristics of the load are known. By utilizing a suitable number of units of the proper dimensions, and resilient material having the required characteristics, a resilient drive is provided which transmits the necessary torque, and, at the same time, suppresses the transmission of both torsional and axial vibration forces between the fan blades and the drive shaft. The resilient material may be made sufficiently soft to permit the fan to rotate above its critical speed in a constant rotational plane and about a fixed center of rotation even though slight inaccuracies in manufacture and alignment of the drive shaft and the fan hub structure may be present.

While a suitable mechanical embodiment for the purpose of disclosing the invention has been illustrated in the accompanying drawings and hereinabove described, it is to be understood that the invention is not limited to the particular mechanical embodiment so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. A fan having a hub with a circumferential channel including an outwardly directed flange, a blade supporting ring concentric with said hub and having its inner rim disposed within said channel, and a plurality of removable ring mounting units disposed in the peripheral space between said hub and said ring, each comprising an outer channel member closely receiving the inner rim of said ring, an inner channel member received closely in said hub channel and resilient means in the space between said channel members.

2. A fan having a hub with a circumferential channel including an outwardly directed flange, means for removably securing said flange to said hub a blade supporting ring concentric with said hub and having its inner rim disposed within said channel, a plurality of removable ring mounting units disposed in the peripheral space between said hub and said ring, each comprising an outer channel member closely receiving the inner rim of said ring, an inner channel member received closely in said hub channel and resilient means in the space between said channel members and bonded to both of the latter, and means for maintaining said units in predetermined relation about the periphery of said hub.

3. In a fan having a plurality of blades mounted in a ring surrounding a hub, a plurality of resilient units between said ring and said hub, each unit comprising a body of resilient material having bonded thereto inner and outer attachment members, and means for releasably securing said attachment members to said hub and to said ring respectively.

4. A fan having a hub, a blade-supporting ring surrounding said hub and concentric therewith, said ring being supported on said hub by a plurality of circumferentially spaced units, each unit comprising a channel attached to said hub, a channel attached to said ring disposed in spaced relation to and within the channel attached to said hub, and a filling of rubber bonded to adjacent faces of said hub and ring channels.

5. A fan having a hub with a circumferential channel on its outer rim, a blade supporting ring surrounding said hub and having an outwardly directed circumferential channel on its inner rim enclosing the inner rim portion thereof, said channels being concentric with said hub, spaced apart one within the other, and resiliently interconnected, and said ring being split in a plane normal to the axis of rotation, the two parts of the ring being held together by bolts near their outer peripheries, and by said outwardly directed channel at their inner peripheries.

6. A fan having a hub with a circumferential channel on its outer rim, a blade supporting ring surrounding said hub and having an outwardly directed circumferential channel on its inner rim enclosing the inner rim portion thereof, said channels being concentric with said hub, spaced apart one within the other, and resiliently interconnected, said ring being split in a plane normal to the axis of rotation, the two parts of the ring being held together by bolts near their outer peripheries, and by said outwardly directed channel at their inner peripheries, said ring also being provided in its outer peripheral portion with sockets, and fan blades having cylindrical shanks received in said sockets, said blades being rotatably adjustable in said sockets when said holding bolts are loosened.

7. A fan including a hub having a pair of spaced radially directed flanges forming a circumferential channel, a blade supporting ring concentric with said hub having its inner periphery located within said channel, the inner margin of said ring being spaced from the adjacent surfaces of said channel to provide an annular channel-shaped space therebetween, and a plurality of channel-shaped ring supporting units disposed in said space, each of said units including radially spaced inner and outer channel members and a resilient member disposed in the channel-shaped space therebetween.

8. A fan including a hub having a pair of spaced radially directed flanges forming a circumferential channel, a blade supporting ring concentric with said hub having its inner periphery located within said channel, the inner margin of said ring being spaced from the adjacent surfaces of said channel to provide an annular channel-shaped space therebetween, and a plurality of resilient channel-shaped ring supporting units disposed in said space, each including an outer arcuate channel member having the inner margin of said ring closely received between the legs thereof, an inner arcuate channel member having its legs closely received within said hub channel, and resilient material disposed in the space between said inner and outer channels and bonded to adjacent faces thereof, and means for securing the legs of said inner and outer channel members to said ring and hub respectively.

9. A fan including a hub having a pair of spaced radially directed flanges forming a circumferential channel, a blade supporting ring concentric with said hub having its inner periphery located within said channel, the inner margin of said ring being spaced from the adjacent surfaces of said channel to provide an annular channel-shaped space therebetween, a plurality of arcuate channel-shaped units providing a resilient support for said ring at spaced intervals about the periphery of said hub, each including a pair of radially and laterally spaced similarly disposed and nested inner and outer channel members and a body of resilient material disposed in the space therebetween and bonded to adjacent surfaces thereof, said outer channel members having their legs extending beyond the ends of said inner channel members, means for attaching the legs of said inner channel members to said hub flanges, and means for attaching the extended legs of said outer channel members to said ring.

CLAUDE O. BRODERS.